US00RE42862E

(19) United States
(12) Reissued Patent
Yang

(10) Patent Number: US RE42,862 E
(45) Date of Reissued Patent: Oct. 25, 2011

(54) HOOK SEAT TIGHTENING STRUCTURE FOR SHIP COVERS

(75) Inventor: Ming-Shun Yang, Taipei (TW)

(73) Assignee: Formosa Saint Jose Corp., Taipei (TW)

( * ) Notice: This patent is subject to a terminal disclaimer.

(21) Appl. No.: 12/232,674

(22) Filed: Sep. 22, 2008

Related U.S. Patent Documents

Reissue of:
(64) Patent No.: 7,111,572
Issued: Sep. 26, 2006
Appl. No.: 11/183,794
Filed: Jul. 19, 2005

(51) Int. Cl.
*B63B 17/02* (2006.01)

(52) U.S. Cl. ..... 114/199; 114/361; 254/391

(58) Field of Classification Search ..... 114/199, 114/218, 361; 254/217, 391, 223, 390, 409, 254/411; 24/68 CD, 68 SK, 68 R
See application file for complete search history.

(56) References Cited

U.S. PATENT DOCUMENTS

| | | | | | |
|---|---|---|---|---|---|
| 2,922,310 | A * | 1/1960 | Anderson | ..... | 474/175 |
| 3,714,838 | A * | 2/1973 | Gilson | ..... | 254/391 |
| 5,368,281 | A * | 11/1994 | Skyba | ..... | 254/391 |
| 5,799,753 | A * | 9/1998 | Peltier | ..... | 182/234 |
| 6,149,133 | A * | 11/2000 | Skyba | ..... | 254/391 |
| 7,546,667 | B2 * | 6/2009 | Yang | ..... | 24/614 |

* cited by examiner

*Primary Examiner* — Ed Swinehart
(74) *Attorney, Agent, or Firm* — Leong C. Lei

(57) ABSTRACT

A hook seat tightening structure for ship covers comprises a body constituted by a seat and a housing, wherein two rollers, one turntable, one wheel, one lock bolt, and one lock member are located therein. A depressing piece and a tenon are located at two sides of the lock bolt respectively. The lock bolt can be rotated and elastically restored by the tenon, which is connected with a spring. The depressing piece is pressed against one-way ratchets on the turntable, and the lock bolt can be rotated subject to a control by a key. A rope enters and is reeved on the turntable and wheel, to constitute a tightening device permitting a one-way gliding of the rope. Accordingly, when the lock member is locked by rotating the key, the tenon on the lock member can be latched on the depressing piece of the lock bolt, thereby achieving a locking function.

8 Claims, 11 Drawing Sheets

HOOK SEAT TIGHTENING STRUCTURE FOR SHIP COVERS

Matter enclosed in heavy brackets [ ] appears in the original patent but forms no part of this reissue specification; matter printed in italics indicates the additions made by reissue.

BACKGROUND OF THE INVENTION (a) Field of the Invention

The present invention relates to a hook seat tightening structure for ship covers, and more particularly to an improved structure for tightening a rope such that a cover will not be blown off by a strong wind after connecting the structure with the cover, and is provided with rollers for enabling a smooth gliding of the rope, and is provided with a locking function. The present invention can be applied to structure of tightening an opening of a bag or alike, and is especially used in a cover of an automobile, a yacht, or an aqua-bike.

(b) Description of the Prior Art

When a common vehicle such as a motorcycle, an automobile, a yacht, or an aqua-bike has to be parked and idle for a longer time, a dust-proof cloth or cover is usually used to cover it. This kind of cover can be used to prevent the vehicle from gaining dust or sand, and can prevent a casing of the vehicle from being cracked by exposure to outdoor sun. As far as a transportation vehicle is concerned, most commonly covers used include a dust cover for an automobile, and a ship cover for a yacht, which can prevent the vehicle from gaining dust or sand, or from an entry by a small animal such as a kitten or a doggy, in order to keep cleaning. On the other hand, a cover in a specific shape is also used for a motorcycle or an aqua-bike for covering in an idle situation.

However, as the dust cover is generally covered on an exterior of the motorcycle, automobile, or yacht; therefore, it is easily to be blown off and dropped accidentally due to a strong wind. Accordingly, an effect of tightly binding is imperative. Furthermore, the conventional cover is not provided with a protection function with a lock; therefore the vehicle is easily to be intruded illegally, which is the essential shortcoming.

As shown in the U.S. Pat. No. 5,368,281, the tightening device for a rope includes a one-way ratchet and a sheave located between an upper and lower housing. After a rope is reeved on the sheave, a one-way tightening device is constituted by engaging a projection with sprocket. On the other hand, when the ratchet mechanism is pivoted, the sheave is permitted to rotate in a counterclockwise direction, thereby permitting loosening of the rope. However, the tightening device disclosed is not provided with a burglar-proof function with a lock, which is harder to prevent from a theft.

Accordingly, an improved structure of tightening device is invented for providing a tightening to a rope without slipping, such that the automobile cover or ship cover will not to be blown off by a strong wind, and for providing a locking function to prevent from an illegal intrusion.

SUMMARY OF THE INVENTION

The primary object of the present invention is to provide a hook seat tightening structure for ship covers, which can actually tighten a rope to cause a slip-proof fixing effect, so as to achieve a tightening function upon connecting to an automobile or ship cover, thereby preventing the cover from being blown off by a strong wind.

Another object of the present invention is to provide a hook seat tightening structure for ship covers, which can be locked and easily used.

Accordingly, the present invention includes primarily a body constituted by a seat and a housing, wherein two rollers, one turntable, one wheel, one lock bolt, and one lock member are located therein. A depressing piece and a tenon are located at two sides of the lock bolt which can be rotated and restored elastically by the tenon connected with a spring. The depressing piece is pressed against one-way ratchets of the turntable, and the lock bolt is connected to a knob outside of the housing for controlling the rotation. The lock member is provided with a key, such that the tightening device itself is provided With a one-way tightening of a rope without slipping, and can be locked and unlocked with the key.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
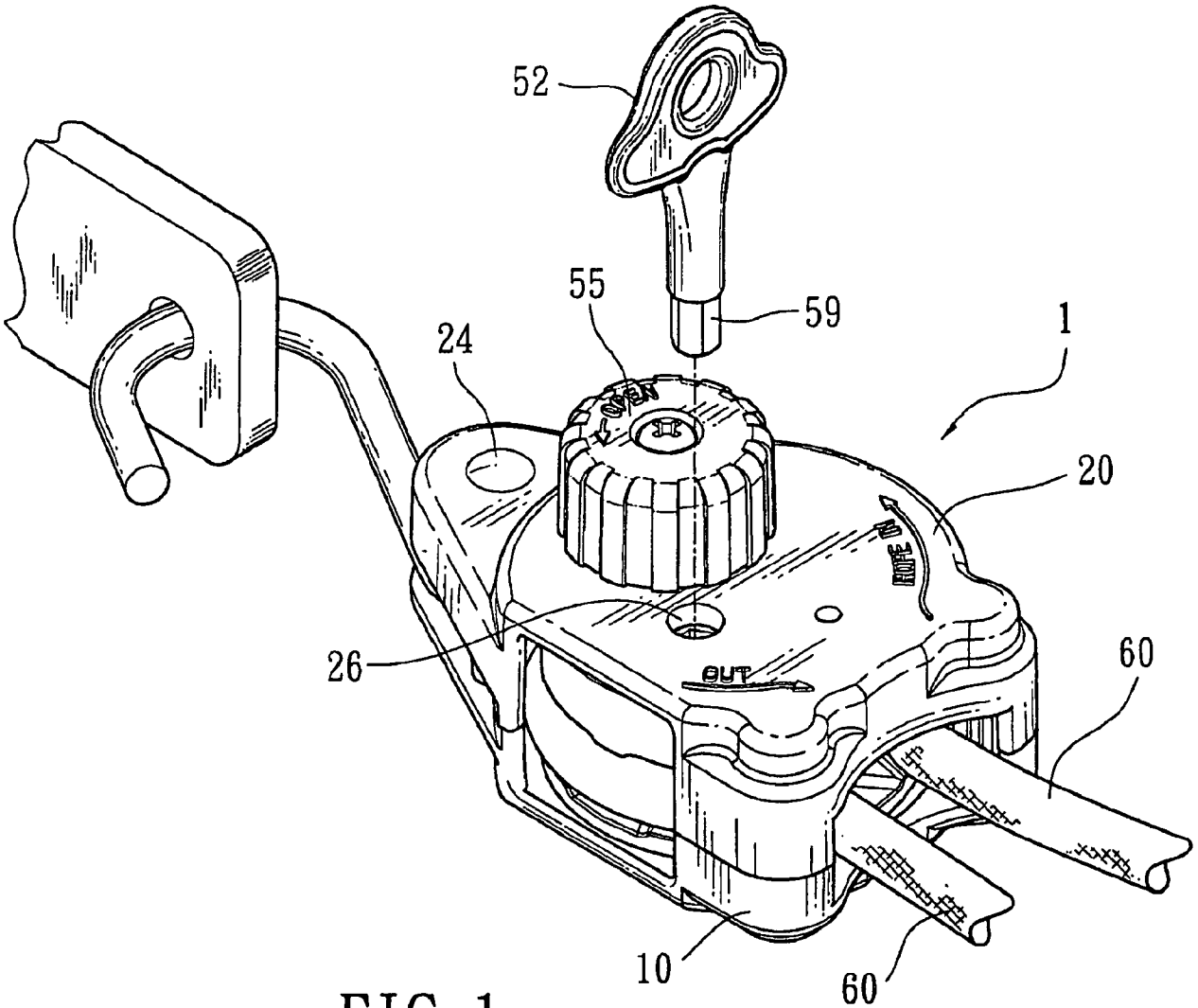
FIG. 1 shows a perspective view of the present invention.
Figure 2:
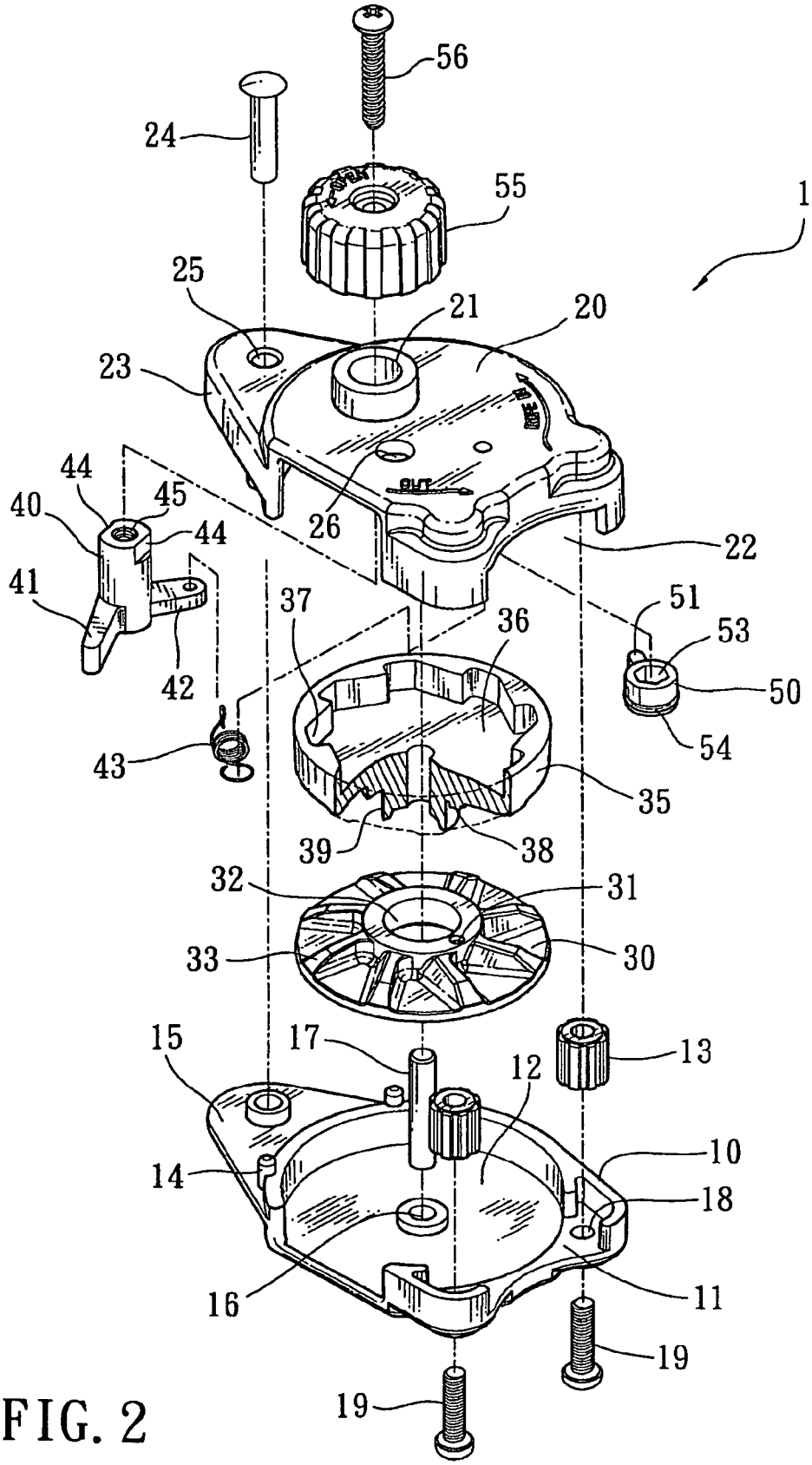
FIG. 2 shows a perspective view of compartments of the present invention.
Figure 3:
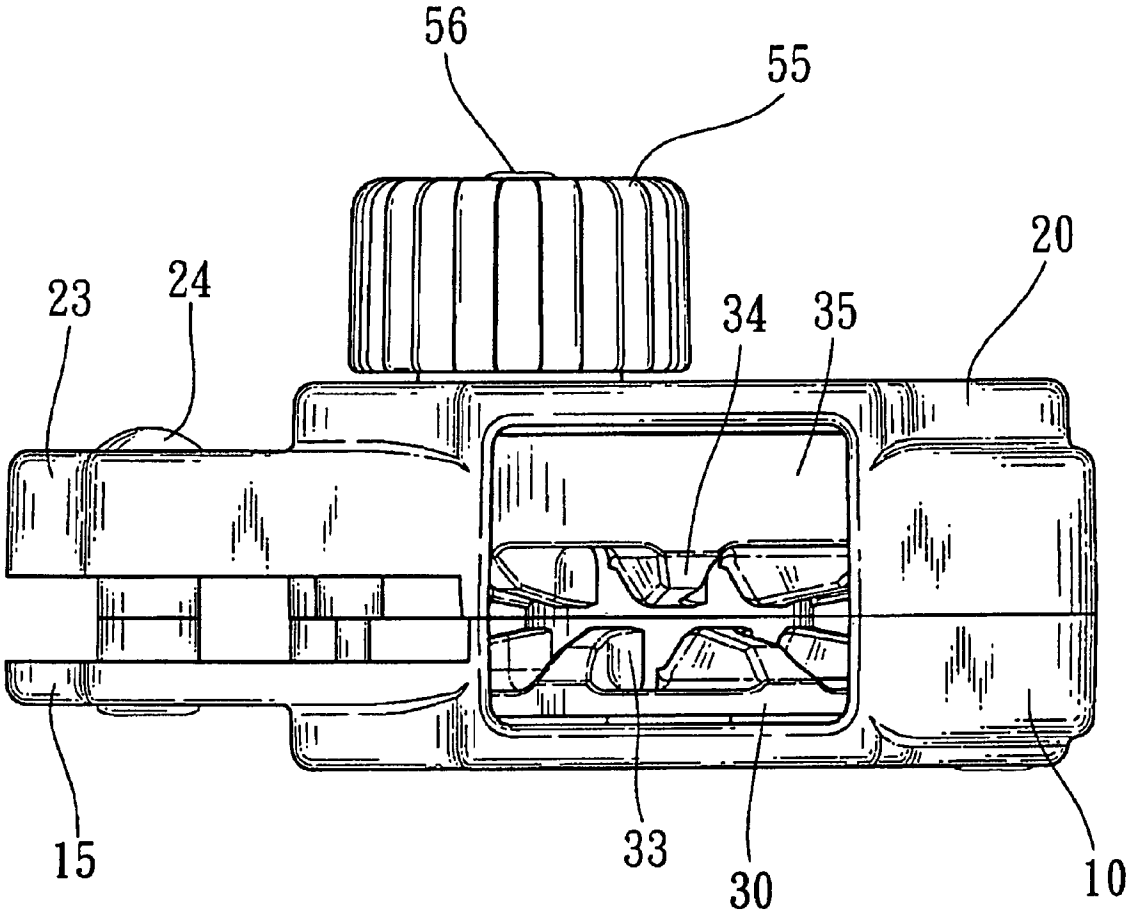
FIG. 3 shows a side view of the present invention.
Figure 4:
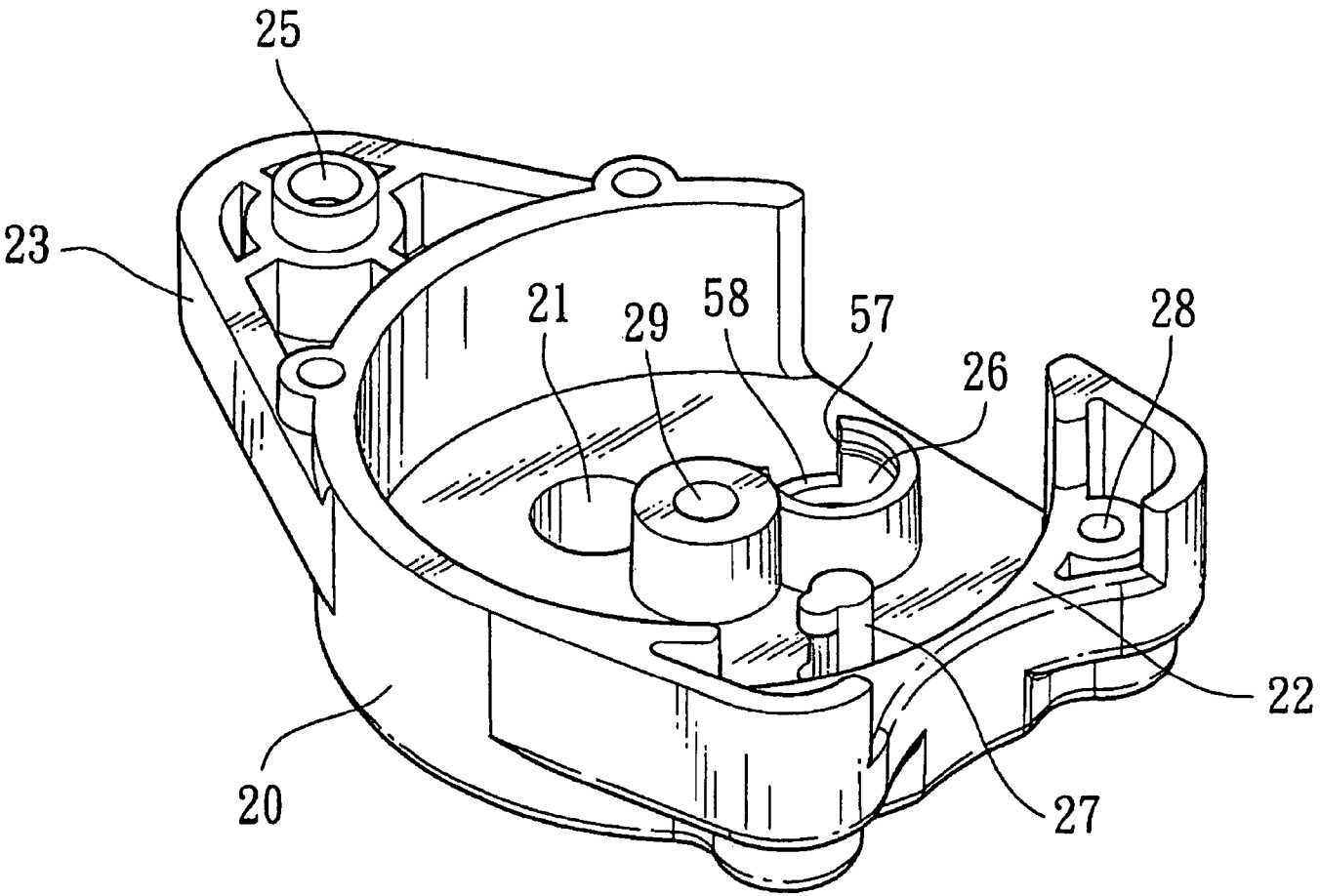
FIG. 4 shows a bottom view of a housing of the present invention.

Referring to FIG. 1 to FIG. 3, a tightening device 1 of the present invention comprises primarily a seat 10, a housing 20, a turntable 30, a wheel 35, a lock bolt 40, and a lock member 50, wherein a rope access 11 is located at a rear end of the seat 10, and two bores 18 are located at two sides of the access 11, respectively. The bores 18 allow for screws 19 to be penetrated from a bottom to a top, and two rollers 13 are located in the seat 10 for locking the screws 19 into the bores 28 (as shown in FIG. 4) at the opposite housing 20, so as to fix the rollers 13 at a left and a right side to the access 11 respectively, thereby preventing a rope 60 from being cracked by a friction in gliding. An indentation 12 is located at a central part in an interior of the seat 10, and a hole 16 is located at a center of the indentation 12 for latching a central column 17. A projection piece 15 is located at a front end of the seat 10, and two latching pins 14 are located at two sides of a root part of the projection piece 15, respectively.

Referring to FIG. 2 and FIG. 4, the housing 20 can be covered with the seat 10 by matching their contours. A through-hole 21 is located on the housing 20, and an access 22 is also located at a rear end of the housing 20, whereas a projection piece 23 is located at a front end of the housing 20. A rivet 24 can be inserted into a through-hole 25 on the projection piece 23 of the housing 20, and is riveted to a hole on the projection piece 15 of the seat 10. A lock hole 26 and a positioning column 27 (as shown in FIG. 4) are located at specific positions of the housing 20. A tube section of the through-hole 21 is protruded from a top surface of the housing 20, with a knob 55 and a screw 56 installed above the through-hole 21, so as to enable the screw 56 to pass through the knob 55 and to be locked on the lock bolt 40. An indentation is also located at a bottom surface of the housing 20, with a bottom end of the through-hole 21, the lock hole 26, the positioning column 26, and a hole 29 being located in the indentation. A tube section is protruded from the lock hole 26, a ring of groove 57 is located at an edge close to an end of the tube section, and a notch 58 is located at the tube section of the lock hole 26.

Referring to FIG. 2, a through-hole 32 is located at a center of the turntable 30, and a positioning hole 31 is located at a side of the through-hole 32. Ridges 33 which are radially extended are located at a periphery of the through-hole 32.

A hollow part 36 is located at a top surface of the wheel 35, with one-way ratchets 37 being located at an edge of the hollow part 36. On the other hand, a central column 39 having a through-hole and ridges 34 (as shown in FIG. 3) which are radially extended are located at a bottom surface of the wheel 35. A column head 38 is located at a side of the central column 39.

A depressing piece 41 and a tenon 42 are located at two sides of the lock bolt 40, respectively. The lock bolt 40 is provided with a bore at its top end, the tenon 42 is provided with a hole for holding one end of a spring 43, a latching plane 44 is located on an exterior wall at a top end of the lock bolt 40, and a bore 45 is located at a top end of the lock bolt 40.

The lock member 50 is provided with a hexagonal inner hole 53, and a tenon 51 is located at a side of the lock member 50. On the other hand, a flange 54 is located at an exterior side of a lower end of the lock member 50.

Accordingly, upon assembling, the two rollers 13 are fixed on the bores 18 at two sides of access 11 of the seat 10 with the screws 19, the central column 17 is then put into the hole 16, passed through the turntable 30 and the wheel 35, and fixed in the hole 29 at the bottom surface of the housing 20. The central column 39 of the wheel 35 is also put into the through-hole 32 at the center of the wheel 30, and the column head 38 of the wheel 35 is latched into the positioning hole 31. On the other hand, the top end of the lock bolt 40 is passed through the through-hole 21 of the housing 20, with the through-hole 21 being sheathed by the knob 55 and locked into the bore 45 on the lock bolt 40 by the screw 56, thereby forming an integral body. The latching plane 44 on the top end of the lock bolt 40 can be latched into a corresponding non-circular hole (not shown in the drawings) at a bottom surface of the knob 55, so as to rotate the lock bolt 40 along with the knob 55. On the other hand, another end of the spring 43 on the tenon 42 of the lock bolt 40 is connected to the positioning column 27 (as shown in FIG. 4) at the bottom surface of the housing 20, and the lock member 50 is fitted on the lock hole 26 of the housing 20 by the hexagonal inner hole 53, so as to latch the flange 54 at the lower end of the lock member 50 into the ring of groove 57 (as shown in FIG. 4) at the end of the lock hole 26. Finally, the housing 20 is covered on the seat 10, and these two casings are riveted into an integral body by passing the rivet 24 through the through-hole 25 and riveting the projection piece 23 of the housing 20 with the projection piece 15 of the seat 10, thereby accomplishing an assembling of the tightening device 1.

Figure 5:
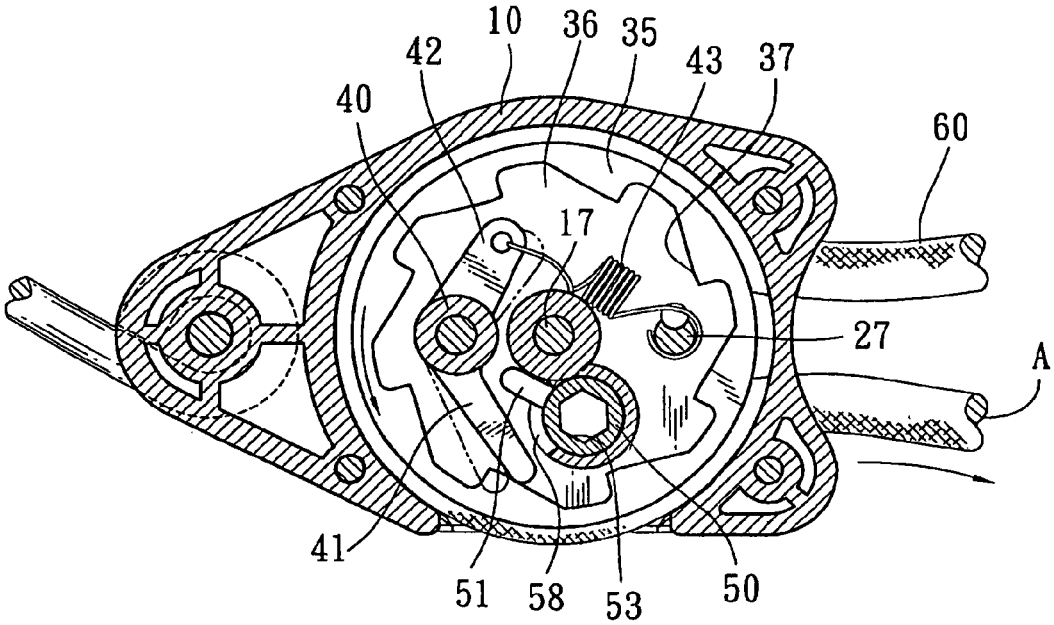
FIG. 5 shows a schematic view of motion of tightening a rope by rotating a wheel of the present invention.
Figure 6:
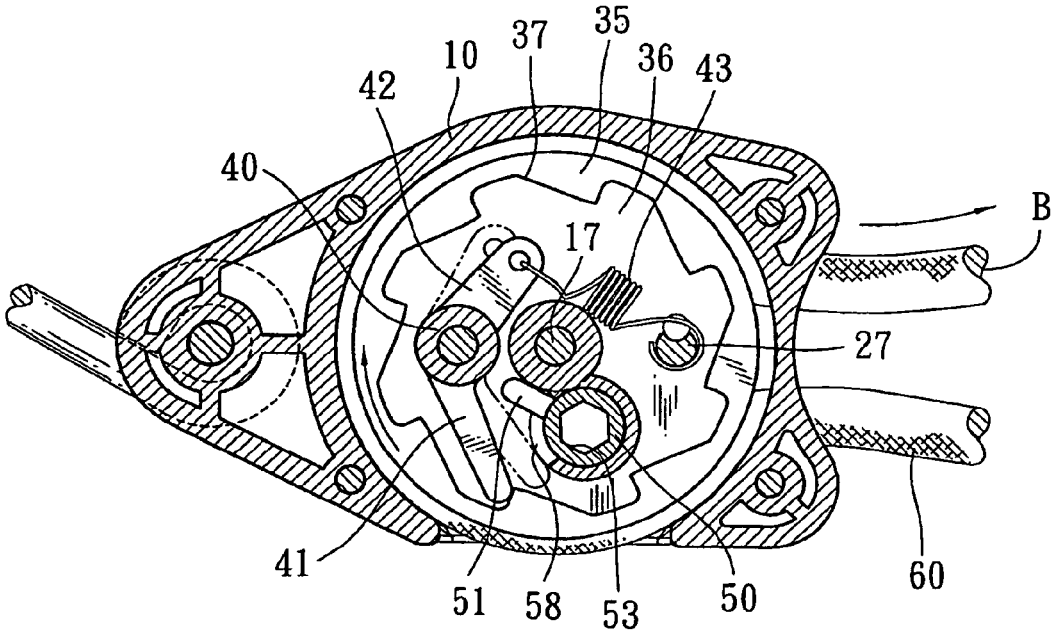
FIG. 6 shows as a schematic view of motion of loosening a rope by rotating a wheel of the present invention.
Figure 7:
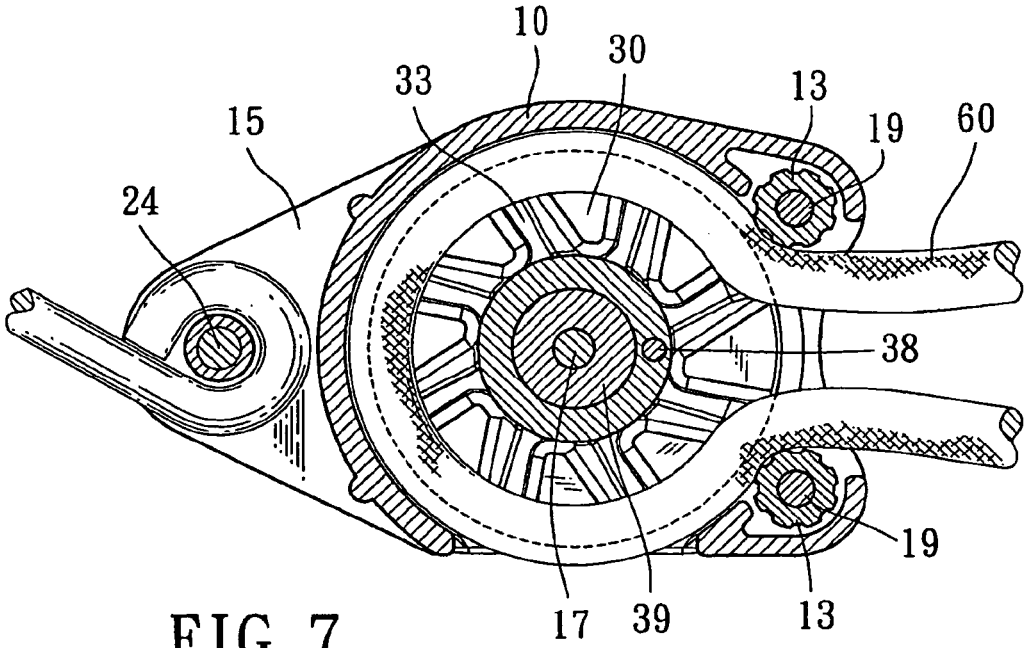
FIG. 7 shows a schematic view of a usage condition of being locked of the present invention.

Referring to FIG. 5 to FIG. 7, the rope 60 enters from the accesses 11, 12 of the tightening device 1 (as shown at an upper side of the drawing), is reeved counterclockwise on the ridges 33 of the turntable 30 and the ridges 34 of the wheel 35, and passes out from the accesses 11, 12 (as shown at a lower side of the drawing), as shown in FIG. 7. When the knob 55 is not rotating (as shown in FIG. 5), the depressing piece 41 of the lock bolt 40 is pressed against the one-way ratchets 37 of the wheel 35; therefore, the wheel 35 can only rotate in one direction (counterclockwise), and the depressing piece 41 will jump on each of the one-way ratchets 37. Accordingly, the rope 60 can be only pulled out from a side A (as shown in FIG. 5), and if the rope 60 is pulled at another side B, it cannot be pulled clockwise due to the fact that the depressing piece 41 has been pressed against the one-way ratchets 37, thereby forming a glide-proof effect. Oh the other hand, when the knob 55 is manually rotated outside of the housing 20, the depressing piece 41 will be moved upward and released from the one-way ratchets 37; therefore, the rope 60 can be pulled from the side B (as shown in FIG. 6) instead.

Figure 8:
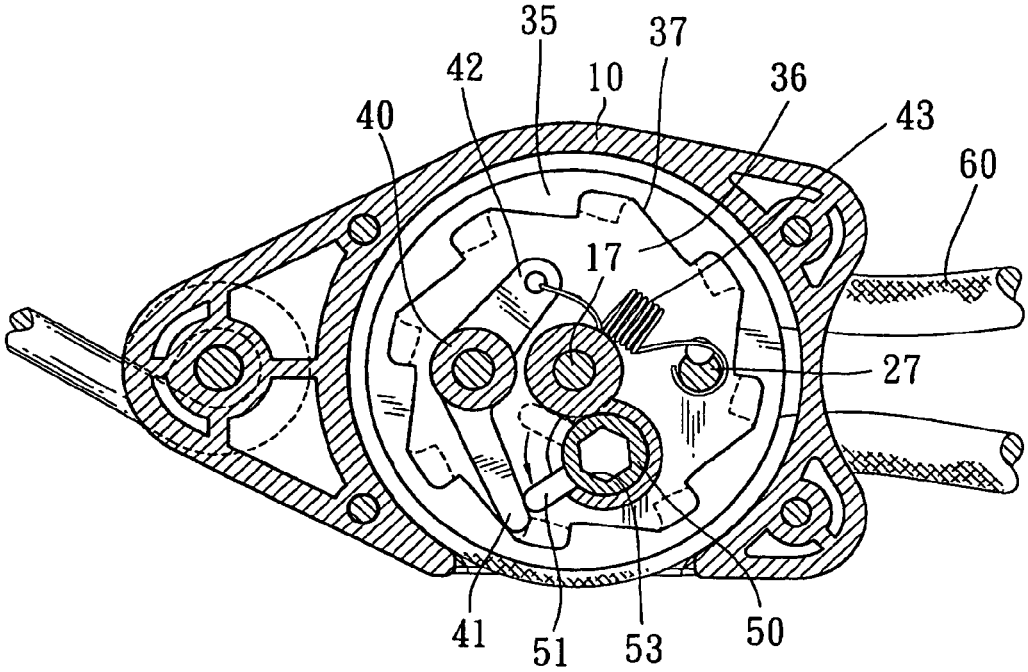
FIG. 8 shows a schematic view of reeving a rope of the present invention.

Referring to FIG. 1 and FIG. 8, when the key 52 is inserted into the lock hole 26, a hexagonal rod 59 at a bottom end of the key 52 is inserted into them hexagonal inner hole 53, so as to rotate the lock member 50 by rotating the key 52, which moves the tenon 51 and enables it to be pressed against the depressing piece 41 of the lock bolt 40. Accordingly, the key 52 cannot be retracted due to a stopping of the depressing piece 41 by the tenon 51, such that the knob 55 cannot be rotated and thereby constituting a locking function. At this time, both sides of the rope 60 cannot be pulled.

Figure 9:
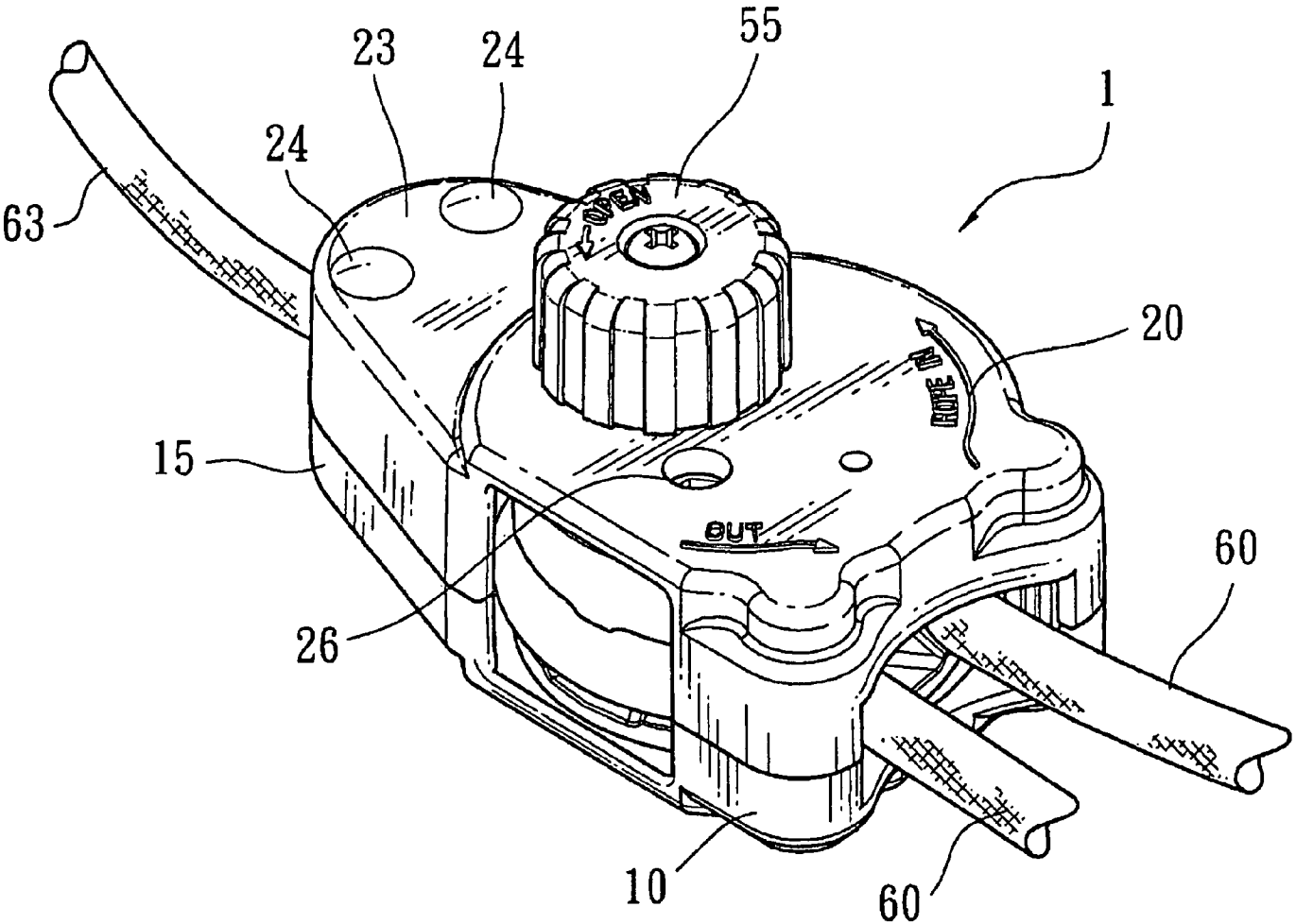
FIG. 9 shows a perspective view of a second implementation of the present invention.
Figure 10:
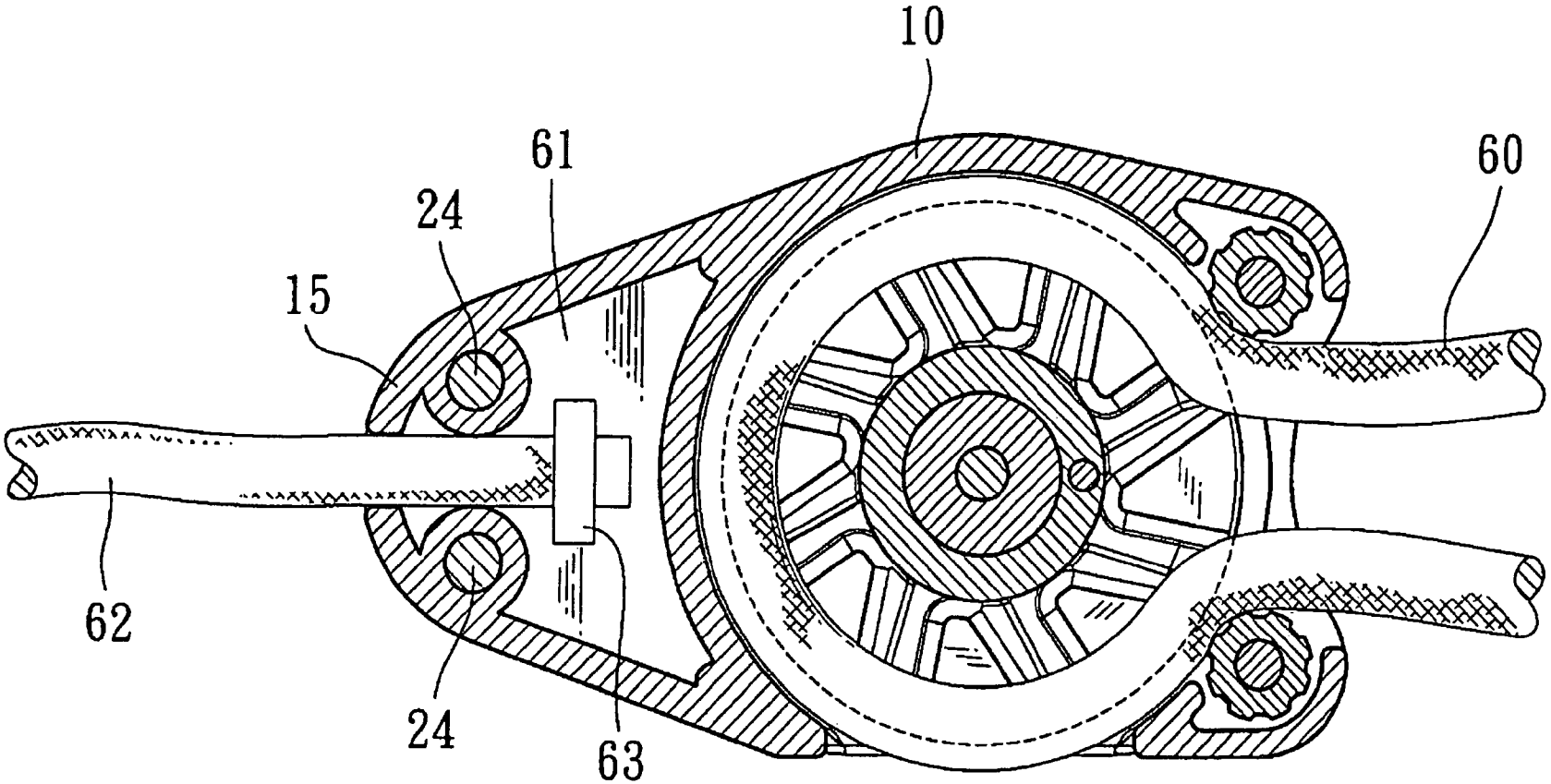
FIG. 10 shows a schematic view of reeving a rope of a second implementation of the present invention.

Referring to FIG. 9 and FIG. 10, in another implementation of the present invention, a design of the seat 10 and housing 20, is changed wherein two through-holes are located at the projection piece 15 at the front end of the seat 10, the projection piece 23 is located at the front end of the housing 20, and two rivets 24 can be used to rivet the seat 10 and housing 20 along these two through-holes. After covering the seat 10 with the housing 20, an internal space 61 is formed. The rope 62 at a dragging end enters from the front ends of the seat 10 and housing 20, and an end piece 63 is latched at the end of the rope 62, so as to fix the rope 62 at the dragging end into the tightening device 1.

Figure 11:
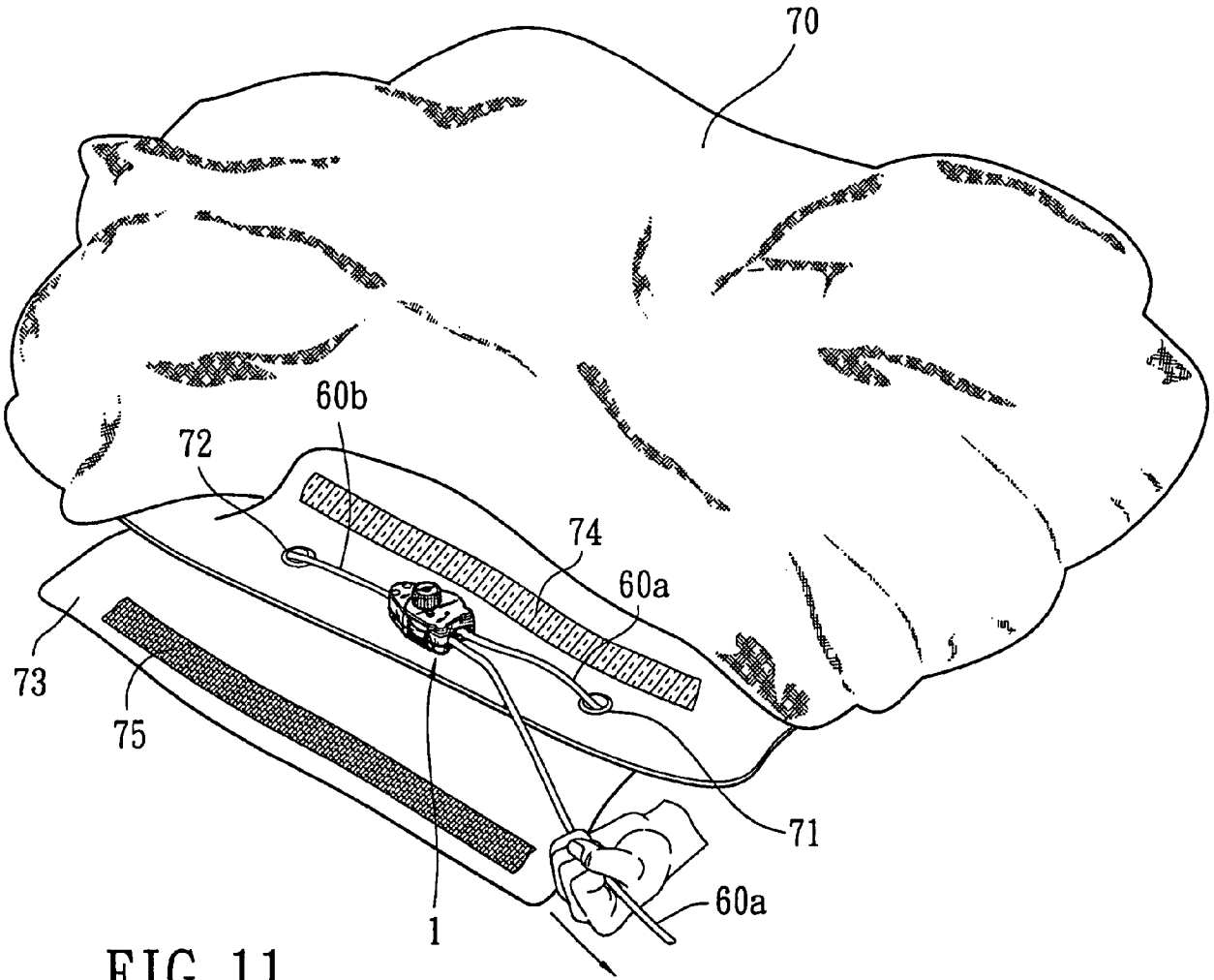
FIG. 11 shows a schematic view of applying the present invention in a cover.

Referring to FIG. 11, a tightening device 1 can be applied to a dust cover 70 whose skirt rim can be sewed to constitute an interlining for hiding a rope. When applied, an end of the rope 60a is passed through a through-hole 71, reeved on a turntable 30 and a wheel 35 of an internal compartment, and extended outside of the cover 70. After another end of the rope 60b passes out of a through-hole 72, its end is latched into an internal space of a projection piece of the tightening device 1 with an end piece. The cover 70 can be tightly bond after pulling the rope end 60a With strength. A decoration sheet 73 is sewed on an exterior of skirt rim of the cover 70, a sticky belt 74 is located on the cover 70, and a band of felt 75 is located on the decoration sheet 73, so as to stick the decoration sheet 70 for hiding the tightening device 1 after folding the decoration sheet 70.

Figure 12:
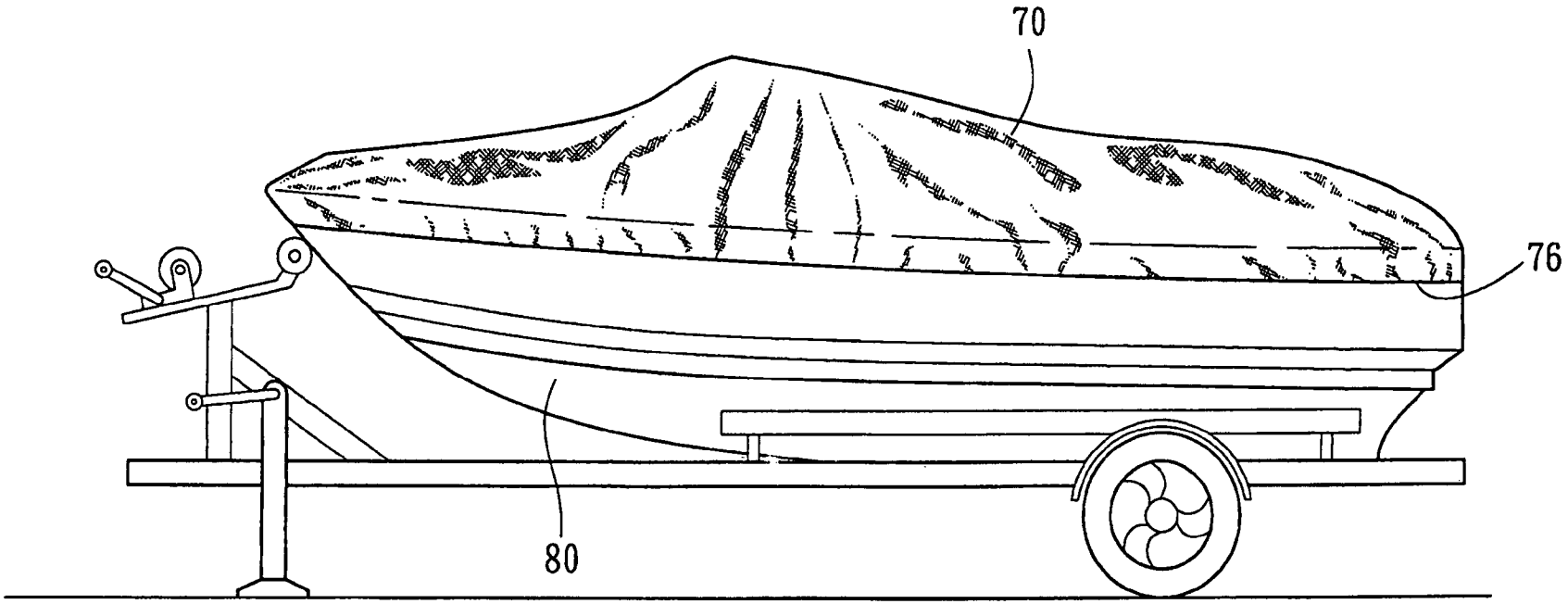
FIG. 12 shows a schematic view of applying the present invention.

Referring to FIG. 12, a dust cover 70 is covered on a yacht 80, and a tightening device 1 is located at a straight section at a rear end of the yacht. When a movable end of a rope 60 is pulled, so as to enable an opening 76 of the dust cover 70 to tighten the yacht 80, a skirt rim of the dust cover 70 can be provided with a tightening function due to a bondage of the rope by an association of the rope with the tightening device 1, thereby preventing the cover 70 from being blown off by a strong wind.

Figure 13:
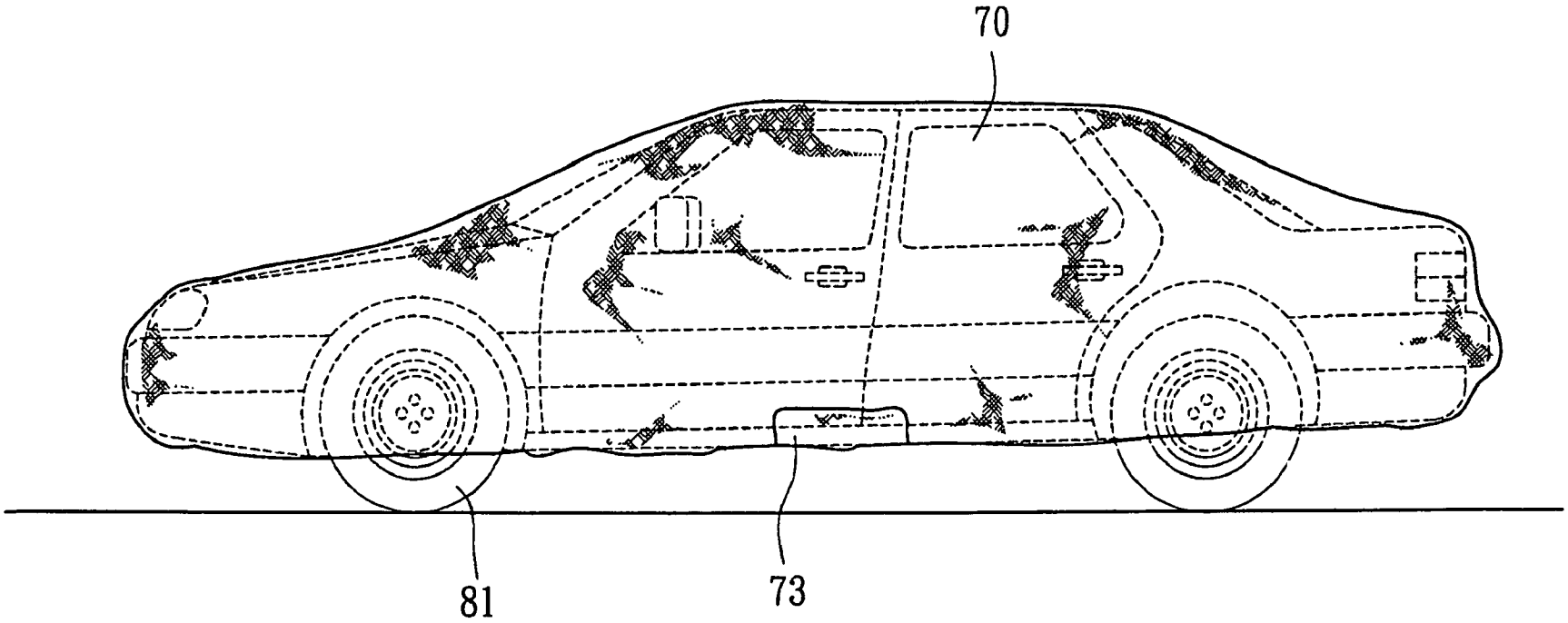
FIG. 13 shows a schematic view of another usage condition.

Moreover, the tenon 51 of the lock member 50 is pressed against the depressing piece 41 of the lock bolt 40 by rotating the lock member 50 with the key 52, which can prevent other people from freely lifting up the dust cover 70. Referring to FIG. 13, in another implementation of the present invention, the tightening device 1 is combined with a dust cover to constitute an automobile cover, wherein a decoration sheet 73 is located at a side of the automobile cover, so as to prevent the dust cover 70 from being blown off by a strong wind, by tightening a skirt rim after covering the dust cover 70 on an automobile 81, thereby providing a function of preventing the dust cover 70 from being blown off by the strong wind, as well as a simple burglar-proof function.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A hook seat tightening structure for ship covers [primarily] comprising*:* a seat and a housing [within which located two rollers, one turntable, one wheel, one lock bolt, and one lock member], *an interior of the housing being provided with a rotation member and, a lock bolt, an exterior of the housing being provided with a knob,* wherein an access is located at a rear end of the seat, [two rollers are latched at two sides of the access,] an indentation is located at a central position in an interior of the seat [With a hole in a center of the indentation], *and* a central column is [latched into the hole for positioning, and a projection piece is located a front end of the seat] *arranged at a center of the indentation*; an access located at a rear end of the housing, an indentation located at a central position in an interior of the housing, a hole located at a center of the indentation, *and* a through-hole [and a lock hole] *being* located on the housing, [a tube section and a positioning column of the lock hole being protruded from a bottom surface of the housing, a notch located on the tube section of lock hole, a lock member being connected with the tube section of lock hole, the lock hole being provided with a hexagonal inner hole, a tenon, which can be rotated and moved in the notch of tube section, located at a side of the lock member, and a projection piece located at a front end of the housing; a through-hole located at a center of the turntable, a positioning hole located at a side of the through-hole, and ridges, which are radially extended, located at a periphery of the through-hole; a hollow part located at a top surface of the turntable, one-way ratchets located at a periphery of the hollow part, a central column having a through-hole and ridges which are radially extended located at a bottom surface, and a column head located at a side of the central column;] a depressing piece and tenon located at two sides of the lock bolt respectively, [a bore located at a top end of the lock bolt,] a hole located on the tenon [with], an end of a spring *being* inserted in the hole, and the other end of the spring *being* hooked on the positioning column of the housing, the depressing piece *being* pressed against [the] one-way ratchets of [turntable, a latching place located on an exterior wall at] *the rotation member,* a top end of the lock bolt[, the lock bolt being rotated by a connection and control of a knob, and the lock member being provided with a key;] *being assembled with the knob,* the housing being covered [on] *with* the seat[, and a rivet being used to rivet the projection pieces of the housing and seat, so as to rivet the two casings to form an integral body] *by matching contours of the housing and the seat*, a rope entering from a side of the access at a bottom of the tightening [device] *structure* and reeved on the [turntable and wheel] *rotation member*, followed by passing out from another side of the access *at the bottom of the tightening structure*.

2. The hook seat tightening structure for ship covers according to claim 1, wherein two bores are located at two sides of the access of the seat respectively, and two screws are used to pass through the bores for latching the rollers, followed by locking the screws on the housing, so as to position the rollers between the seat and housing.

3. The hook seat tightening structure for ship covers according to claim 1, wherein the lock bolt passes out from the through-hole of housing, and a screw is used to pass through the knob to connect with the lock bolt and knob, and the latching place is located on an exterior wall at a top end of the lock bolt for latching the knob.

4. The hook seat tightening structure for ship covers according to claim 1, wherein the lock member is connected with the tube section of lock hole, a ring of groove is located at an edge close to an end of the tube section, and a flange located at a lower end of the lock member for being latched into the ring of groove, so as to fit the lock member with the lock hole.

5. The hook seat tightening structure for ship covers according to claim 1, wherein a hexagonal rod, which can be inserted into the hexagonal inner hole of the lock member, is located at a bottom of the key, and the lock member can be rotated by rotating the key.

*6. The hook seat tightening structure for ship covers according to claim 1, wherein the rotation member is constituted by a turntable and a wheel, a center of the turntable is provided with a through-hole, a positioning hole being provided offset from a side of the through-hole, and a rim of the through-hole is provided with radiant ridges; a top surface of the wheel being provided with a hollow part, a rim of the hollow part being provided with the one-way ratchets, and a bottom surface of the wheel being provided with a central column having a through-hole and radiant ridges, whereas a side of the central column being provided with a column head.*

*7. The hook seat tightening structure for ship covers according to claim 1, wherein a front end of the seat is provided with a projection piece which is riveted with a projection piece provided at a front end of the housing.*

*8. The hook seat tightening structure for ship covers according to claim 1, wherein a top end of the lock bolt is provided with a bore which is locked on the knob by passing through the knob with a screw, an outer wall at the top end of the lock bolt is provided with a latching plane, and the lock bolt rotates by being connected and controlled by the knob.*

* * * * *